INVENTOR

ERNEST S. VAN VALKENBURG

BY James L. O'Brien

ATTORNEYS

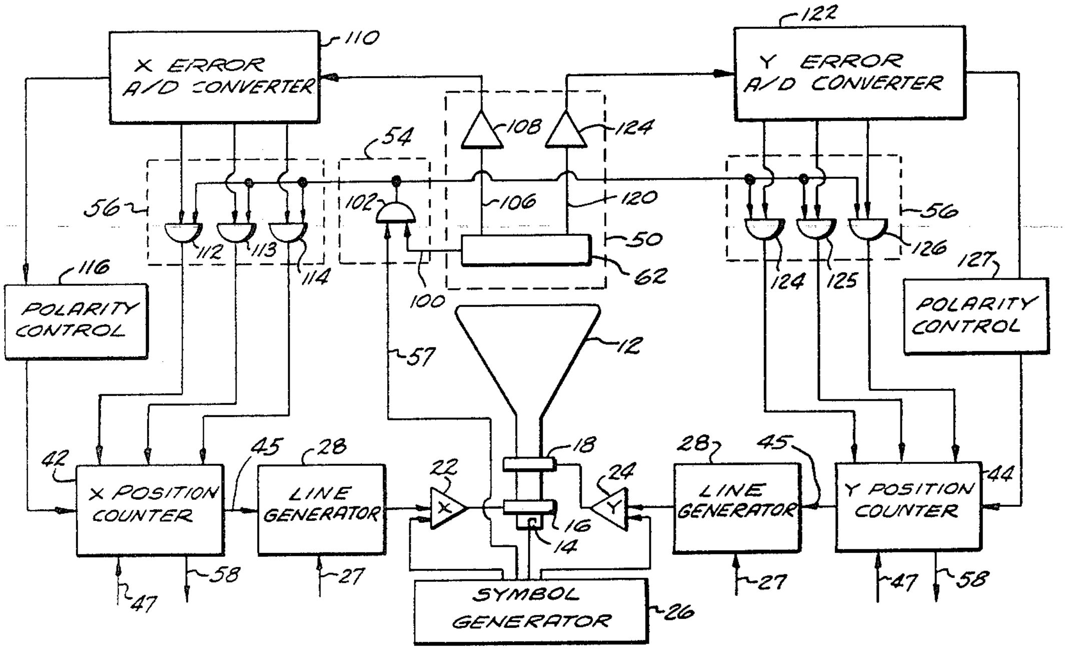
FIG. 5
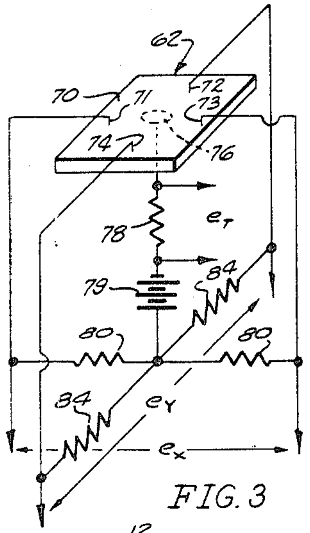
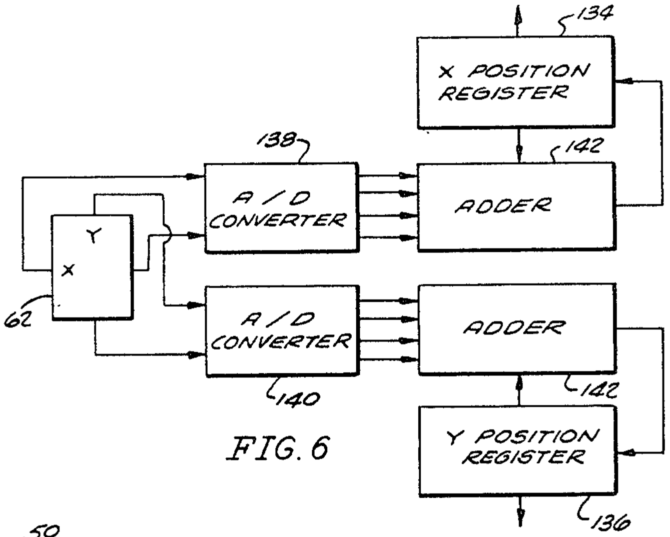
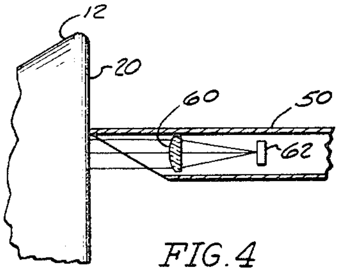
INVENTOR
ERNEST S. VAN VALKENBURG
BY James L. O'Brien
ATTORNEYS United States Patent Office 3,440,638
Patented Apr. 22, 1969

3,440,638
DATA DISPLAY SYSTEM WITH LATERAL PHOTOCELL FOR DIGITAL REPOSITIONING OF DISPLAYED DATA

Ernest S. Van Valkenburg, Ann Arbor, Mich., assignor to The Bendix Corporation, Ann Arbor, Mich, a corporation of Delaware Filed Apr. 8, 1965, Ser. No. 446,590
Int. Cl. G08b *23/00;* G01s *9/00;* H01j *29/70*
U.S. Cl. 340—324 2 Claims

ABSTRACT OF THE DISCLOSURE

A data display system having a display screen with a plurality of visible items displayed sequentially thereon, a hand held lateral photocell for providing a pair of output signals corresponding to the displacement along orthogonal axes between the photocell and item. A coincidence detector to identify the item according to the time at which it is displayed, and an error detector and increment control to reposition the identified item to correspond with the position of the pencil.

This invention relates generally to data systems where items are visually displayed in time sequence at specified locations on the display. More particularly this invention relates to a data display system where a displayed item can be manually selected with a light detector and then repositioned on the display by manually moving the detector across the display to the desired position.

One type of high speed digital computer includes a cathode ray tube display operated under command of a computer. Normally the computer is operated cyclically to repeatedly perform operations on incoming data according to the computer program. To enable the operator to alter the computer program in connection with the display, the operating cycle of the display is divided between command data input and display data output. During the data output portion of the cycle instructions are read from computer storage and used to generate a display frame on the cathode ray tube. The display frame is composed of symbols whose type and location on the display are derived from computer storage in digital form. A digital buffer reads instructions for each symbol, including both symbol type and symbol location instructions. The buffer then transfers the instructions to appropriate apparatus which generates the specified symbol at a specified location on the cathode ray tube. Instructions for each symbol are transferred successively in time sequence by the buffer and the symbols are displayed individually in accordance with that sequence to make up a complete display frame. During the command input portion of the cycle the computer senses instructions which are under the control of the operator. By means of manual switches an operator can send specific requests to the computer for action to be taken concerning an item or location specified on the display. An item or a location may be identified to the computer by means of a light detector which the operator places over that item on the display. The buffer then proceeds with the next data display frame.

One such data display system is disclosed in United States Patent No. 3,037,192, issued on May 29, 1962, in the name of Robert R. Everett, and entitled, "Data Processing Systems." The computer operated display disclosed in the Everett patent incorporates a particular type of cathode ray tube known as a "Charactron." Two separate deflection systems are used with the "Charactron." One deflection system directs the electron beam to a location on a character matrix corresponding to the symbol that is to be displayed. The other deflection system repositions the beam from the character matrix at a specified location on the display. Another type of computer operated display uses a conventional cathode ray tube and deflects the electron beam with a line generator and a stroke-type symbol generator. The line generator determines a particular display location for the beam and then the symbol generator deflects the beam about that location to generate a particular symbol on the display. In either type of computer operated display individual symbols are written successively in time sequence to generate the complete display frame. When a particular symbol is specified by the operator for further action to the computer, digital information used to generate the display is noted, and used to designate that particular symbol location or symbol type to the computer. In addition to element designation by the operator, it is desirable that the operator be able to alter the display by repositioning the symbols on the display in connection with requests that are sent to the computer.

The objects of this invention include repositioning a selected item on a data display by a method and apparatus that are rapid, effective, and simple to use; that are under direct manual control of the operator; that are readily usable with known data display systems without extensive modification and are therefore economical to use; that minimize time and procedure in correlating the position of a displayed item and new positions specified by the operator; and that rapidly and effectively transfer information from the display into digital storage under direct manual control of the operator.

In general this invention contemplates a manually movable light detector which an operator can place over any symbol being displayed. As the operator moves the light detector across the display, any displacement between the location of the detector and the symbol specified are sensed to provide a displacement error signal. At the time each symbol is displayed, its digital location is readily available. The displacement error signal may then be used to increment the digital location of the symbol selected, either directly or after temporary storage, to correspond to the position of the light detector. The incremented or corrected digital location is used to reposition the symbol on the next display frame at the new location. In accordance with one aspect of the present invention a lateral-effect photocell, hereinafter called a lateral photocell, is used as a light detector. The lateral photocell directly provides a pair of displacement error signals resolved along orthogonal axes of the photocell which are oriented by the operator along orthogonal deflection axes of the cathode ray tube.

Further objects, features and advantages of this invention will become apparent from a consideration of the following description, the appended claims, and the accompanying drawing in which:

FIGURE 3 is a view illustrating a lateral photocell for use with the circuits illustrated in FIGS. 1 and 2 for detecting displacement errors between the location of a displayed item and the location of the photocell and for resolving the displacement error along orthogonal axes;

FIGURE 4 is a fragmentary side view of a light pencil which houses the lateral photocell;

FIGURE 5 is a detailed block diagram of the system shown in FIG. 1 incorporating the lateral photocell and a pair of position counters for incrementing the digital location of the item in accordance with error signals from the lateral photocell;

FIGURE 6 is a simplified block diagram illustrating a modification in the circuit shown in FIG. 5 wherein the position counters are shift registers, and adders are used to increment the digital location in the registers.

Figure 1:
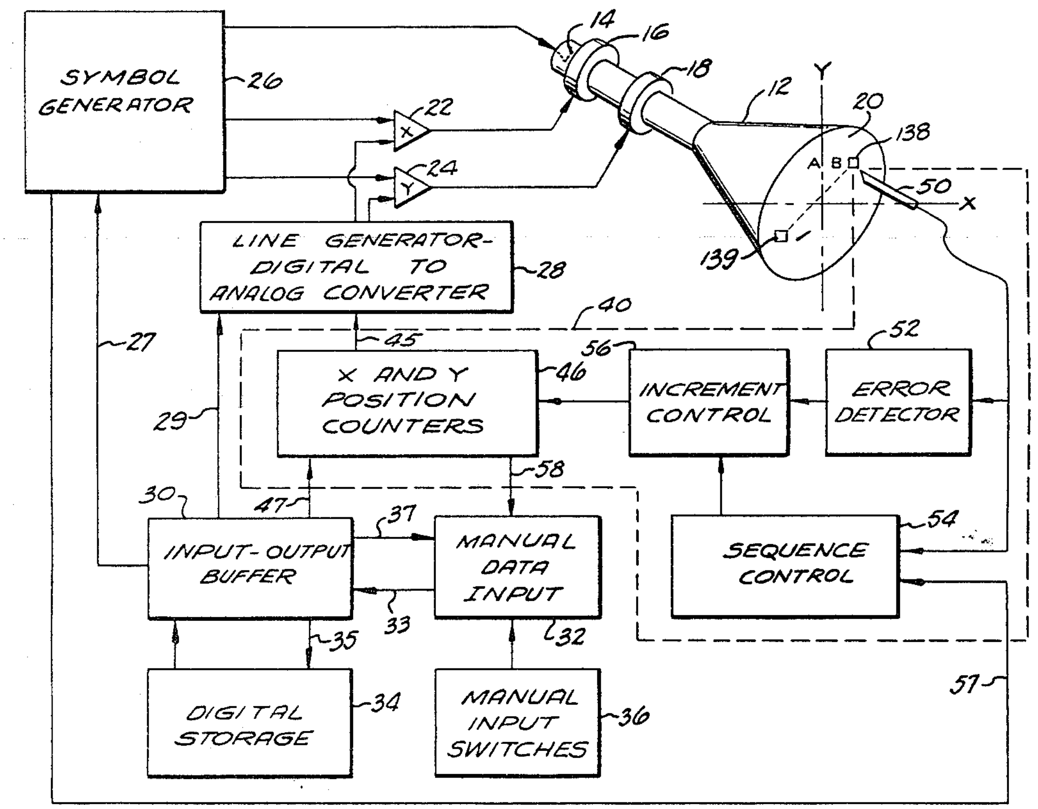
FIGURE 1 is a simplified block diagram of a data display system which includes a symbol positioning system constructed in accordance with the present invention for moving the first symbol in the display sequence by incrementing the digital location of that symbol, in accordance with a displacement error signal derived from a light detector which is under manual control of the operator.

Referring to FIG. 1 a generally conventional cathode ray tube 12 comprises an electron gun 14 which produces a concentrated electron beam. The beam is projected between a pair of deflection coils 16, 18 that deflect the beam horizontally and vertically along orthogonal axes of tube 12, referred to hereinafter as the X and Y axes, respectively. The electron beam impinges on a screen 20 which is coated with luminescent material to provide a luminous visual display. Coil 16 is energized by analog signals from a deflection amplifier 22 to deflect the electron beam horizontally along the X axis. Similarly coil 18 is energized by analog signals from a deflection amplifier 24 to deflect the electron beam vertically along the Y axis. Each of the amplifiers 22, 24 are in turn energized by analog signals from a symbol generator 26 and a digital to analog converter or line generator 28. In general the signals from line generator 28 are analog representations of a discrete spot or location on screen 20 whereas the signals from generator 26 are analog signals for generating a particular symbol display at the location specified by line generator 28. Intensity signals from symbol generator 26 are also connected to gun 14 to energize the gun during a symbol display and blank the electron beam between symbol displays. Symbol generator 26 and line generator 28 are each connected to an input-output buffer 30 by lines 27, 29, respectively. For the display of each symbol, buffer 30 simultaneously transmits location instructions, in digital form, to line generator 28 via line 29 and symbol type instructions, also in digital form, to symbol generator 26 via line 27.

Buffer 30 is arranged to operate in cycles with each cycle divided into an input portion and a data output or data display portion. During the data input portion of the cycle instructions can be transferred from a manual data input 32 (via a line 33) to a digital storage 34 (via a line 35) on command from buffer 30 (via a line 37). Data is supplied to the manual data input 32 by means of manual input switches 36 which are under manual control of the operator. During the output or display portion of the cycle buffer 30 reads instructions for each symbol to be displayed from storage 34 and then successively in time sequence transfers the instructions for each symbol to line generator 28 and symbol generator 26. As used in this application, the term "time sequence" denotes the manner in which a display of symbols is generated. In a time sequence display a particular symbol is generated only for a predetermined time duration during each display cycle or frame. Thus during each frame each symbol has an individual position in the sequence of the display. The time sequence in a display need not be related to any regular position sequence on the display. In general the display system described above is similar to that used in computer operated displays. In such a system, storage 34 would be under the control of a computer (not shown) for processing incoming data in accordance with the computer program in the manner set forth in the aforementioned Everett patent.

In accordance with one aspect of the present invention the first symbol generated during the display portion of the operating cycle of buffer 30 is a particular symbol called a cursor. Any symbol could be designated by the operator as the cursor. In general the cursor may be used by the operator in connection with requests to a computer.

By way of example a typical cursor might be a cross or a very small square. The particular symbol to be used as the cursor is set by the operator on manual input switches 36 and is transferred to storage 34 via input 32 and buffer 30 during the input portion of the buffer cycle. With the circuit shown in FIG. 1 the cursor is the symbol selected by the operator for repositioning under manual control of the operator by means of a light pencil system outlined in dashed lines in FIG. 1 and designated by numeral 40.

The light pencil system 40 generally comprises an X position counter 42 (FIG. 5) and a Y position counter 44 (FIG. 5) designated collectively as XY position counters 46 in FIG. 1. Counters 46 contain the X and Y digital locations for the cursor. At the beginning of each display portion of the buffer cycle the cursor symbol type is transmitted to symbol generator 26 from storage 34 by buffer 30. The cursor location is transferred to line generator 28 from counters 46 (via a line 45) on command (via a line 47) from buffer 30. The light pencil system 40 also comprises a light detector in the form of a light pencil 50 which can be held by the operator and moved over the display on screen 20 of the cathode ray tube 12. In response to light from a displayed symbol over which pencil 50 is placed, the pencil provides an output signal representative of any displacement error between the symbol selected and the pencil 50. Pencil 50 is constructed with a relatively small field of view to intercept light from only a single symbol display. Although the display appears visually as a continuous display, each symbol in the display is generated separately for a very short duration and therefore the output from pencil 50 is coincident in time with the signals from generators 26, 28 for the symbol then being displayed. The output signal from pencil 50 is applied to an error detector 52 and to a sequence control 54. Detector 52 provides a digital error signal representing any displacement between the location of pencil 50 on the display and the location of the cursor on the display. The digital error signal from detector 52 is transferred to counters 46 through an increment control 56 to correct the digital location in counter 46 in accordance with the direction and magnitude of the error signal from detector 52. Sequence control 54 is also connected to generator 26 by a line 57 to receive timing signals from the generator during the time that the cursor symbol is generated. On coincidence of a timing signal for the cursor and an output from pencil 50, sequence control 54 enables increment control 56 to assure that counters 46 are incremented only when the output from pencil 50 is coincident with the display of the cursor symbol. Timing signals could be taken from buffer 30 rather than from the symbol generator. At the beginning of the next display frame the incremented digital location in counters 46 will cause the cursor to be displayed at the new location. Thus pencil 50, error detector 52, and counters 46 serve as a follow up system to reposition the cursor on the display in accordance with the location of the pencil 50. The incremented X and Y digital location may also be stored in the manual data input 32 via a line 58 for transfer to storage 34 during the next data input portion of the buffer cycle.

Referring to FIGS. 3 and 4 pencil 50 houses a converging lens 60 and a lateral photocell 62 which exhibits both lateral and transverse photovoltage effects. The front end of pencil 50 is open to receive light when pencil 50 is placed against screen 20. Light received by pencil 50 from a displayed symbol is focused as a discrete spot on photocell 62 by lens 60. The location of the light spot on photocell 62 depends on the position of pencil 50 relative to the symbol. Photocell 62 is per se conventional and comprises a semiconductor wafer 70 having four ohmic contacts 71, 72, 73, 74 arranged in two pairs 71, 73 and 72, 74. The contacts in each pair are spaced from the center of the photocell in opposite directions along orthogonal lateral axes of wafer 70 to develop lateral photovoltages. Photocell 62 also has junction electrode 76 disposed at the center of wafer 70 to develop a transverse photovoltage. Junction 76 is connected to an output resister 78 and a bias battery 79. Contacts 71, 73 are connected to battery 79 by a pair of resistors 80 and contacts 72, 74 are connected to battery 79 by a pair of resistors 84.

In use pencil 50 is oriented on screen 20 of the tube 12 by the operator so that contacts 71, 73 are disposed horizontally, parallel to the X axis of tube 12, and contacts 72, 74 are disposed vertically, parallel to the Y axis of tube 12. Thus when light from a displayed symbol impinges as a spot on photocell 62, the output voltage across resistor 78, $e_t$, represents the magnitude of the total light. The voltage across resistors 84, $e_y$, is a measure of the displacement between the symbol and pencil 50, in magnitude and direction, along the Y axis of tube 12. Similarly the voltage across resistors 80, $e_x$, represents the displacement between the symbol and pencil 50, in magnitude and direction, along the X axis of tube 12.

Referring to FIG. 5 the total light signal across resistor 78 is connected via a lead 100 to a threshold detector 102 in the sequence control 54 (FIGS. 1 and 5). Detector 102 also receives a timing signal from symbol generator 26 via line 57 when the cursor is generated. The threshold level for detector 102 requires that pencil 50 be disposed over the cursor as it is displayed so that detector 102 will not operate on spurious light from other symbols. Detector 102 may also have a threshold which varies depending on the symbol selected by the operator. The X axis error signal across resistors 80 is connected via a lead 106 to a preamplifier 108 which is housed in pencil 50. The analog output of preamplifier 108 is in turn connected to an analog to digital converter 110 which provides a digital representation of the displacement error along the X axis. Converter 110 also provides rate control for incrementing the X position counter 42 to reposition the cursor on the next display frame. By way of example converter 110 may be a binary three bit converter. A large displacement error between the position of pencil 50 on the display and the position of the cursor adds a one to the third least significant bit stored in counter 42; a smaller error adds a one to the second least significant bit; whereas a one is added to the least significant bit to provide fine control depending upon the minimum detectable displacement error. The three bit output from converter 110 is coupled to counter 42 through three coincident gates 112, 113, and 114 in the increment control 56 (FIGS. 1 and 5). A gating signal from threshold detector 102 is connected to each of the gates 112, 113, 114, to open the gates only while the cursor symbol is generated and only if sufficient light is detected to justify incrementing counter 42. The digital error from converter 110 is added or subtracted from the digital location instructions in counter 42 depending on the direction of the displacement error as functionally illustrated by a polarity control 116 connected between converter 110 and counter 42. Counter 42 is connected to the X axis deflection coil 16 through line generator 28 and amplifier 22. The line generator 28 converts the digital location from counter 42 to an analog deflection voltage.

The circuit for processing the displacement error signal along the Y axis is substantially identical to that described above for the X axis error signal. The output from resistors 84 is connected via a lead 120 to an analog to digital converter 122 through a preamplifier 124. Converter 122 provides a digital output representing the displacement error along the Y axis which is transferred to the Y position counter 44 by coincident gates 124, 125, 126 and a polarity control 127. Gates 124, 125, and 126 are also controlled by the threshold detector 102. Counter 44 is connected to the Y deflection coil 18 through line generator 28 and amplifier 24.

Initially when a display is being generated the cursor will be located at a random position on the luminous screen 20 depending on the previous digital location in counters 42, 44, for example at an upper right location designated by numeral 138 in FIG. 1. At the beginning of each display frame the X and Y position counters 42, 44, on command from buffer 30, deflect the electron beam to the location 138 on screen 20 and the beam is deflected about that location by symbol generator 26 to display the cursor at that location. When it is desirable to reposition the cursor on the display at a lower left location 139 the operator first places pencil 50 against the face or screen 20 of the cathode ray tube and over the cursor. With pencil 50 disposed over the cursor, each time the cursor is generated, light from the cursor strikes photocell 70. As the operator moves pencil 50 across the display to reposition the cursor, photocell 70 provides an output each time the cursor symbol is generated. The photocell output contains a light intensity signal, $e_t$, and two signals proportional to the X and Y displacement errors, $e_x$, $e_y$. The analog error signals are converted to digital signals by converters 110, 122 to increment counters 42, 44. At the beginning of the next display frame, the cursor will be displayed at a new location determined by the position of pencil 50 at the time the cursor was displayed in the next preceding display frame. Correction for the displacement error continues until the cursor is moved to location 139. When pencil 50 is removed the cursor will remain at location 139. Since the output from photocell 62 is resolved along orthogonal axes of the photocell the operator must keep the photocell properly aligned with the deflection axes of tube 12. An operator can easily correct for accidental rotation of the pencil 50 to keep the axes aligned while the cursor is being repositioned.

In FIG. 5 counters 42, 44 may be bi-directional counters capable of counting either up or down. With a bi-directional counter positive or negative bits are merely added algebraically in the counter. If a shift register is used then the X and Y position errors must be converted to digital words and separate adders used to increment the digital location as illustrated in FIG. 6. A shift register 134 contains the X location of the cursor and a shift register 136 contains the Y location of the cursor. Registers 134, 136 correspond generally to counters 42, 44 in FIG. 5 and are arranged to transfer the cursor location to a line generator on command from the buffer 30 in FIG. 1. A pair of analog to digital converters 138, 140 corresponding to converters 110, 122 (FIG. 5), provide a digital three bit representation of the displacement error together with a polarity signal. The displacement error for each of the X and Y axes is added to the digital location from registers 134, 136 by adders 142, 144, respectively, and the corrected digital location is entered into registers 134, 136.

Figure 2:
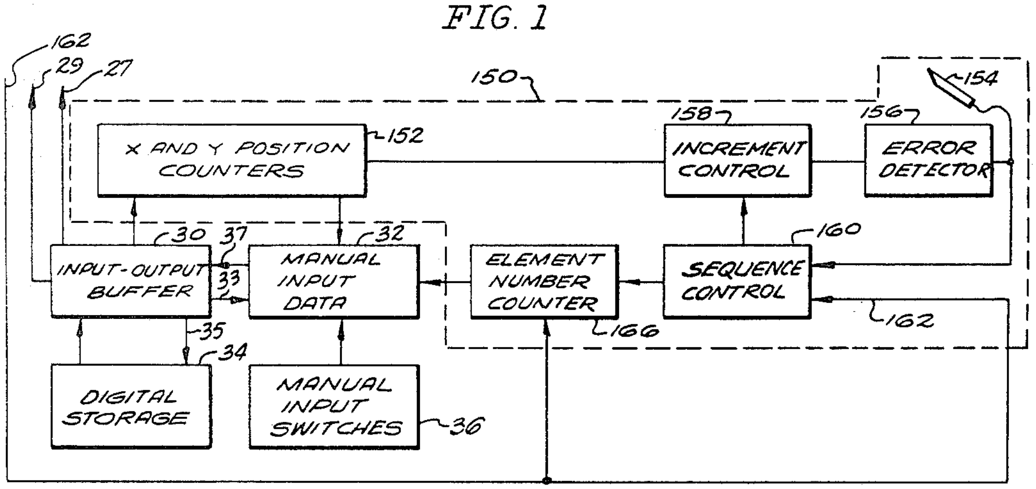
FIGURE 2 is a simplified block diagram illustrating a modification in the system illustrated in FIG. 1 wherein time coincidence between the display of any symbol and the output from a light detector placed over that symbol permits repositioning that symbol on the display by incrementing the digital location of that item while the item is being displayed.

In the method and apparatus described hereinabove, the cursor is the first symbol generated during each display and the digital location of the cursor is stored separately and thus is readily available for incrementing in accordance with a displacement error signal from pencil 50. However the present invention is useful in repositioning any symbol generated at any position in the display sequence. Referring to FIG. 2 a symbol repositioning system 150 is illustrated as including X and Y position counters 152 which receive and hold temporarily the digital position for each symbol as that symbol is displayed in a time sequence determined by buffer 30. Thus the digital position for each symbol is available in time coincidence with the display of that symbol. The manner in which the position counters 152 are incremented is substantially identical to that described above in connection with FIGS. 1–5.

A light pencil 154 is connected to an error detector 156 for sensing any displacement errors between pencil 154 and a symbol over which the pencil is placed. Pencil 154 and the error detector 156 are substantially identical to pencil 50 and error detector 52 (FIG. 1). Error detector 156 is connected to an increment control 158 which is substantially identical to increment control 56 (FIG. 1). Increment control 158 provides a digital displacement error signal which is transferred to counter 152 to increment the digital location in counter 52. The output from pencil 154 is also connected to a sequence control 160 which corresponds generally to sequence control 54 (FIG. 1). Sequence control 160 is also connected to symbol generator 26 (FIG. 1) by line 162 to receive a timing signal coincident with the generation of each symbol display. Timing signals from symbol generator 26 are also applied to an element number counter 166 to increment counter 166 each time a symbol is displayed. Counter 166 is reset at the end of each display frame so that the number in counter 166 corresponds to the position of the symbol in the time sequence of each display frame. Counter 166 also receives a disabling signal from sequence control 160. The disabling signal is produced by sequence control 160 upon coincidence of a timing signal from the symbol generator 26 and an output signal from light pencil 154.

Thus when pencil 50 is placed over any given symbol, the element number corresponding to its time position in the display sequence together with the incremented X and Y position are available during each display frame. The element number and incremented location for a symbol selected by the operator are used to rewrite the symbol at its new location in storage 34 so that on the next display frame a symbol will be displayed at the new location. The symbol number and incremented location are stored temporarily in the manual data input 32 and are transferred to storage 34 during the data input portion of the buffer cycle. Alternatively, by simple modifications in buffer 30, the incremented position of a symbol selected by pencil 50 may be written directly into storage 34 immediately after that symbol is displayed and while the symbol type and other information relating to the symbol are readily available. The circuit illustrated in FIG. 2 can also provide symbol designation in a manner set forth in the aforesaid mentioned Everett patent since the output from element number counter 166 designates the symbol selected by the operator. The symbol type and location information may be written into storage 34 through the manual data input 32 for purposes other than repositioning the symbol to send specific requests to a computer for action to be taken concerning the item or location specified with pencil 154.

Although a lateral photocell 70 (FIG. 3) is preferred for sensing displacement errors between the pencil (50, FIG. 1; 154, FIG. 6) and a selected symbol, other light detectors may be used. For example, photocell 70 may be replaced by a small rectangular array of four single photocells disposed in pairs along orthogonal axes and interconnected to provide the required horizontal and vertical displacement errors.

It will be understood that the data display system which is herein disclosed and described is presented for purposes of explanation and illustration and is not intended to indicate limits of the invention, the scope of which is defined by the following claims.

What is claimed is:

1. In a data processing system which includes storage of digital location data for displaying a plurality of items, means generating a luminous visual display of said items successively in time sequence at locations on said display specified by said digital location data, said data including a pair of digital location components for each item representing respective locations on a pair of orthogonal axes of said display, and means for moving one of said items from a first display location to a second display location comprising manually movable means disposable in front of said display adjacent said first location, lateral photocell means carried by said manually movable means and responsive to the display of said one item to provide a pair of analog output signals, said photocell means having a pair of orthogonal axes related to said axes of said display, each of said analog output signals representing a displacement between said photocell means and said one item along a respective one of said axes of said photocell means, a first analog to digital converter responsive to one of said analog output signals for providing a first digital error signal representing one of said displacements, a second analog to digital converter responsive to the other of said analog output signals for providing a second digital error signal representing the other of said displacements, a first position counter operatively connected in said system to identify the digital location component for said one item along one of said display axes while said one item is displayed, a second position counter operatively connected in said system to identify the digital location component along the other of said display axes for said one item while said one item is displayed, first means operatively coupled between said first converter and said first counter to increment the digital location component in said first counter in accordance with said first digital error signal, and second means operatively coupled between said second converter and said second counter to increment the digital location component in said second counter in accordance with said second digital error signal, said first and second means being operative when an output from said lateral photocell means for said one item is substantially coincident with the generation of the display of said one item.

2. In a data processing system which includes storage of digital location data for displaying a plurality of items, means generating a luminous visual display of said items successively in time sequence at locations on said display specified by said digital location data, said data including a pair of digital location components for each item representing respective locations on a pair of orthogonal axes of said display, and means for moving a selected one of said items from a first display location to a second display location comprising manually movable means disposable in front of said display adjacent said first location, lateral photocell means carried by said manually movable means responsive to the display of said one item to provide a pair of analog output signals, said photocell means having a pair of orthogonal axes related to said axes of said display, each of the analog output signals representing a displacement between said photocell means and said one item along a respective one of said axes of said photocell means, a first analog to digital converter responsive to one of said analog output signals for providing a first digital error signal representing one of said displacements, a second analog to digital converter responsive to the other of said analog output signals for providing a second digital error signal representing the other of said displacements, a first position counter operatively connected to said storage to identify the digital location component for each of said items along one of said display axes while that item is displayed, a second position counter operatively connected to said storage to identify the display location component along the other of said display axes for each of said items as that item is displayed, first means operatively coupled between said first converter and said first counter to increment the digital location component in said first counter in accordance with said first digital error signal, and second means operatively coupled between said second converter and said second counter to increment the digital location component in said second counter in accordance with said second digital error signal, said first and second means being operative when an output from said photocell means for said selected one of said items is substantially coincident with the generation of the display of that item.

References Cited

UNITED STATES PATENTS

| | | | |
|---|---|---|---|
| 3,028,500 | 4/1962 | Wallmark. | |
| 3,346,853 | 10/1967 | Koster | 340—324 |
| 3,337,860 | 8/1967 | O'Hara | 340—324.1 |
| 3,089,918 | 5/1963 | Graham | 340—324.1 |
| 3,189,889 | 6/1965 | Bridgett | 340—324.1 |
| 3,256,516 | 6/1966 | Melia et al. | 340—324.1 |
| 3,292,489 | 12/1966 | Johnson et al. | 340—324.1 |

OTHER REFERENCES

Randa, G. C., "CRT Display With Pen Tracking," IBM Technical Disclosure Bulletin, vol. 5, No. 2, July 1962.

JOHN W. CALDWELL, *Primary Examiner.*

ALAN J. KASPER, *Assistant Examiner.*

U.S. Cl. X.R.

178—6.5; 250—217; 315—18; 343—5